United States Patent Office 3,179,590
Patented Apr. 20, 1965

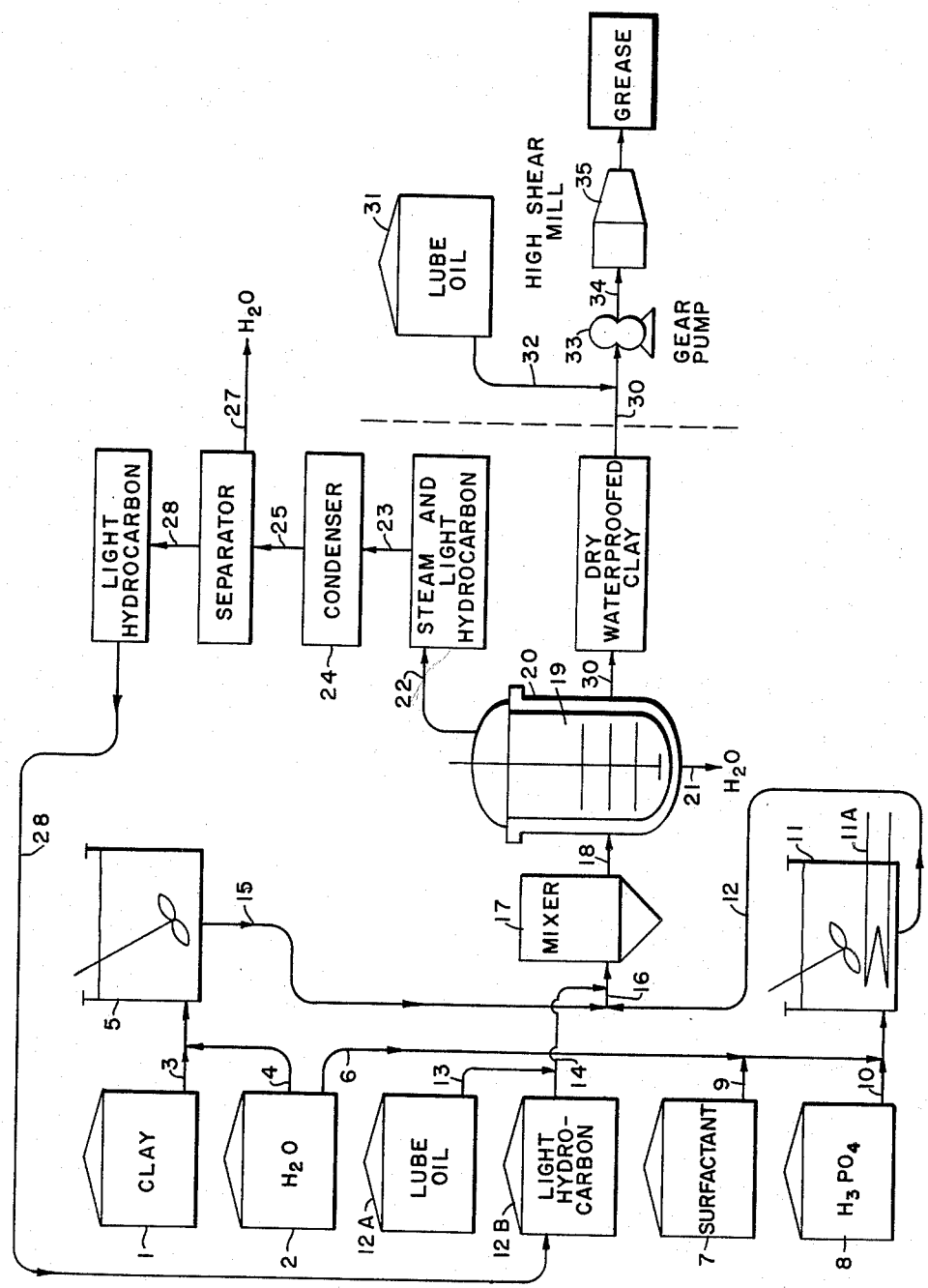

3,179,590
PROCESS FOR PREPARATION OF WATER-RESISTANT CLAY THICKENING AGENTS
Donald E. Loeffler, Walnut Creek, and Harvey E. Hook, Danville, Calif., assignors to Shell Oil Company, New York, N.Y., a corporation of Delaware
Filed Feb. 13, 1961, Ser. No. 88,999
6 Claims. (Cl. 252—28)

This invention relates to the preparation of water-resistant clays suitable for the manufacture of thickened oils, greases, drilling fluids, paints, inks, wax compositions and the like. More particularly, it pertains to an improved process for the preparation of water-proof clays while maintaining maximum gelling power of the clay.

Oleaginous compositions, such as greases and drilling fluids, have been prepared by utilizing inorganic colloids or gelling materials prepared therefrom as thickening agents. Typical materials within these classes include onium clays and clays bearing water-proofing proportions of hydrophobing substances such as surface active agents or polymers. The preparation of gels suitable for effective thickening of oil has heretofore been difficult and limited to relatively expensive processes requiring the use of elaborate plant equipment. For example, spray drying processes have been proposed wherein a hydrogel of silica is combined with a water-proofing agent and a small amount of lubricating oil after which the composition is spray dried to obtain a powdery product which may be incorporated in oil. The chief disadvantage of such a process lies in the high heat requirement necessary for spray drying all of the water necessary for proper dispersal of the clay. Such a process, in fact, has not reached commercial exploitation because of this high heat requirement.

Another possible process which has been considered in the past for the preparation of greases gelled with inorganic colloids such as silica comprises the combination of silica hydrogel with a water-proofing material and oil, an amount of alcohol being added to the mixture sufficient to form a homogeneous phase with all of the ingredients. After this the alcohol and water are azeotroped out, the amount of alcohol being maintained such that a homogeneous phase exists at all times. In this process the grease composition comprising silica hydrogel, water-proofing agent and oil are formed in situ and all that remains to be done is to mill the mixture to form a grease structure. The chief disadvantage of this process lies in the difficulty of separating water from alcohol since an azeotrope is formed which is difficult to separate by distillation means. It is because of this difficulty of separation of water from alcohol that the so-called "alcogel" process has not reached any important commercial development.

The most promising commercial process for the preparation of greases gelled with clays has comprised the so-called "direct transfer process." In this aspect of clay grease manufacture, a clay hydrosol is combined with a water-proofing compound such as a hydrophobic amine and oil with mixing and in such proportions that water separation occurs, the bulk of the water separating from the remaining ingredients and removed by simple settling and draw-off at the bottom of a tank or kettle. It then is necessary to heat the remaining ingredients sufficiently to distill any remaining water, thus leaving a mixture of oil, clay and water-proofing agent which is then milled sufficiently to produce a grease structure.

In accordance with this procedure, however, it will be noted that it has been essential to form the grease at the site where the "direct transfer" step has occurred. This means, therefore, that a preparation of a grease in the elaborate mechanism required must be performed at any geographical location where grease is to be utilized or dispensed. Consequently, wide-spread employment of clay greases would require an uneconomical multiplicity of grease-making plants. Alternatively, it is necessary to ship the finished greases from a given grease-making plant for uneconomical distances. If it is possible to provide a water-proofed clay which can be incorporated in an oil at some future time and at remote geographical areas relative to the clay plant while at the same time maintaining high grease quality without elaborate grease-making equipment, then such a process would be of important economic significance.

It is an object of this invention to provide an improved process for the preparation of water-proofed clay thickening agent. It is another object of this invention to provide a water-proofed clay thickening agent suitable for incorporation in lubricating oils or in numerous other media at geographical locations completely divorced from the point at which water-proofed clay is prepared if so desired. It is a particular object of the invention to accomplish the foregoing objects without degrading the thickening ability of the water-proofed clay. Other objects will become apparent during the following description of the invention.

The figure illustrates a suitable assembly of apparatus for carrying out this process.

Now, in accordance with the present invention, a process has been found for the preparation of clay powders which avoids the disadvantages of prior processes such as those described above. The new process comprises the steps of admixing a clay hydrosol with 35–125% by weight, based on clay, of a water-proofing coating compound therefor, and 500–5,000% by weight, based on clay, of a water-immiscible relatively volatile inert organic liquid, whereby the clay, coating compound and a minor proportion of water associated with the organic liquid separates from the major proportion of water which is removed, and volatilizing the remaining water and volatile organic liquid whereby clay bearing a superficial water-proofing coating of the coating compound is formed.

In accordance with one preferred aspect of the invention a small amount of a lubricating oil, preferably 50–150% by weight based on clay is mixed with the clay prior to evaporation of the minor amount of water and volatile liquid therefrom. The presence of the lubricating oil at this stage promotes the maintenance of high thickening power of the product so obtained. The product of the described process is preferably pulverulent but may be of a crumbly or somewhat sticky nature dependent in part at least upon the proportion of lubricating oil present therein. As the proportion of lubricating oil is increased dispersal of the product in any medium at a later stage (such as in oil for the formation of grease) becomes progressively easier. On the other hand, the "drier" the product is and more powdery in form, the simpler storage and transmittal is, such as in bags and the like. Incorporation in additional amounts of oil or other media is somewhat facilitated, particularly where other powdered ingredients are being mixed into a composition, such as an oil base gelling fluid. Consequently, the precise character of the end product may be designed to fit the exact use to which the product is to be put. However, it is not an object of the invention to prepare a grease-like composition except by the addition of further proportions of lubricating oil or other media beyond those described in the basic process of the invention. The product of the described process is one to which other ingredients are normally to be added for eventual utilization thereof.

The maximum thickening power of the water-proofed clay is promoted by the utilization of optimum proportions of the water-proofing compound, the relatively volatile organic liquid and lubricating oil optionally added. The optimum proportions based on the weight of dry clay, comprised 60–85% water-proofing compound, 650–2,500% (e.g., 750–1,500%, 800–1,200%) relatively volatile organic liquid and 50–200% (e.g., 70–150%, 100–150%) lubricating oil. Any one or a combination of these optimum proportions effectively increases the subsequent thickening power of the water-proofed clay product.

The process of the invention is best understood by reference to the figure: Clay and water from sources 1 and 2 passed by means of lines 3 and 4 to a mixer 5 wherein the clay hydrosol is formed. This normally contains about 1–5% by weight of clay, after the gangue has been allowed to separate and is removed. The water-proofing agent, which may be a hydrophobic surfactant, is preferably dispersed from a source 7 by means of line 9 in water from source 2 and line 6, the mixing being carried out in the stirred container 11, which may be heated by a steam jacket or heating coils 11A. Preferably, the aqueous dispersion of the surfactant is modified with a mineral acid such as phosphoric acid from source 8 which is introduced into line 6 by means of line 10. The postulated purpose of the phosphoric acid is to neutralize sodium ions normally present in natural clays since these have been found to be detrimental for certain uses of the water-proofed clay product.

The clay hydrosol from the stirred receptacle 5 and the aqueous dispersion of the surfactant (with or without phosphoric acid) from receptacle 11 are passed by means of lines 12 and 15 where they are mixed with a light volatile solvent such as a light hydrocarbon from source 12B, introduced into the mixing lines by means of line 14. Preferably, lubricating oil is introduced from a source 12A into the light hydrocarbon line by means of line 13. The entire mixture then passes by means of line 16 through a mixing device 17 selected for intimate contact of all of the ingredients. The mixed ingredients then passed by means of line 18 into a jacketed stirred kettle 19 preferably fitted with a steam jacket 20, a water draw-off 21 and a top closure suitable for drawing vacuum and removing volatile products. The mixture is allowed to settle for a time sufficient to enable the separation of a major proportion of the water which is then drawn off by means of line 21. The remaining ingredients are then heated sufficiently to cause volatilization of any remaining water and the light inert liquid (such as light hydrocarbon) which are removed by means of line 22 and sent by means of line 23 to condenser 24 and passed by line 25 to a separator 26. Condensed water separates from the water immiscible volatile inert liquid which is then sent by means of line 28 back to the storage vessel 12B. Water drawn off from the separator is sent to a disposal unit by means of line 27.

The essentially dry solid product, comprising water-proofed clay, leaves the kettle 19 by means of a screw feeder or other powder handling device indicated by line 30 and is alternatively packaged for shipment to any point for subsequent utilization at a buyer's convenience or may be immediately utilized for the formation of a grease composition or for other purposes. Assuming that a grease is to be made at the site from the dry water-proofed clay, the latter is sent by means of line 30 wherein it is combined with a lubricating oil from a source 31 introduced into line 30 by means of line 32, the mixture being passed through a mixing device such as a gear pump 33, from which it emerges into line 34 and preferably passed to a high shear mill 35 for the formation of a grease structure.

The clays to be utilized in the process of the invention are those having a substantial base exchange capacity, preferably between about 60 and 100 milliequivalents of exchangeable base per 100 grams of clay. These include particularly the montmorillonites especially the sodium, potassium, lithium and other bentonites such as Wyoming bentonite, magnesium bentonite (sometimes called hectorite) and saponite.

The water immiscible relatively volatile inert liquid may include any organic liquids having boiling points below about the gas oil range of hydrocarbon and preferably boiling in the range of kerosene or gasoline. Specifically, they may be hydrocarbons having from about 5 to 18 carbon atoms per molecule and preferably have a boiling range between about 150 and 450° F. Preferred materials include naphtha which is a mixture of hydrocarbons having a boiling range between about 225 and 325° F. or a kerosene having a boiling range from about 300 to about 400° F. Other water immiscible organic materials may be utilized for this purpose as long as they are within the broad boiling range recited herewith and may include esters, alcohols, ketones or ethers but because of cost factors the hydrocarbons are preferred.

The lubricating oil which may be added as an optional and desirable component prior to water separation may be of mineral origin or a synthetic lubricant. The viscosity of the oil is immaterial to the success of its use in the present instance, but it is preferred to be an oil useful in the eventual utilization of the water-proofed gel. It is employed in an amount between 50 and 200% based on the weight of dried clay and in these proportions does not cause undue agglomeration of the water-proofed clay particles after water and volatile hydrocarbon removal.

In addition to mineral lubricating oils, other synthetic lubricants which are utilized in grease manufacture include aliphatic esters of aliphatic dibasic acids such as adipate, sebacates and pelargonates of alcohols having from 4 to 12 carbon atoms per molecule including particularly 2-ethyl hexyl alcohol and 3-ethyl heptyl alcohol, as well as the normal alcohols such as normal hexyl normal octyl and normal decyl alcohols. Esters of pentaerythritol are suitable, including particularly the mixed esters of $C_4$–$C_8$ fatty acids and pentaerythritol. Dimers of pentaerythritol may be used in place of or in addition to monomeric pentaerythritol. Silicone fluids may be employed as well as polyphenyl ethers, polyalkylene oxides and polyalkylene glycols, as well as the ethers and esters of the latter. Phosphorus esters such as trioctyl and tricresyl phosphates may be employed in place of or in addition to other lubricating oils.

Acidification of the clay, insofar as its alkaline metal cations is concerned, is preferably effected with phosphoric acid at the time that the surfactant and light hydrocarbon are combined with the clay hydrosol. Alternatively, however, acidification may take place prior to such contact in a separate acidification step. The proportion of phosphoric acid to be employed for this purpose is neither essential nor critical for the successful practice of the present invention. However, when employed, it is preferred that phosphoric acid be utilized in an amount between 5% and about 10% by weight of clay having a base exchange capacity range such as that recited hereinbefore.

The water-proofing compounds to be utilized in the process of the invention are known in the clay grease art and include hydrophobic cation surface active agents which are either reacted with or absorbed upon the clay surface. The onium clays, for example, are formed by reaction between the acid sites on clay and onium (preferably ammonium) ions having a hydrocarbon chain of a molecular area of at least 70 sq. A. units and preferably one in which there is an organic radical with at least 10 carbon atoms in a straight chain. Suitable species for this type of water-proofed clay include particularly dodecyl ammonium chloride, octadecyl ammonium chloride, as well as the corresponding bromides.

Maximum gelling power is achieved in making such products if certain polar solvents are present in addition, particularly nitrobenzene. Preferred products are obtained wherein the hydrophobic surface acting agent is believed to be physically absorbed upon the clay surface at least in part. Such materials are known in the grease art and are described in the patent literature. These include long chain fatty amines such as octadecyl amine and more particularly the amino amides and imidazolines formed between polyalkylene polyamines and fatty acids either saturated or unsaturated. Especially suitable amino amides for this purpose which are oil soluble and water insoluble are formed between fatty acids having from 16 to 20 carbon atoms per molecule, at least 50% by weight of the fatty acids containing $C_{10-20}$ carbon atoms per molecule with a mixture of polyethylene polyamines, the naphtha or kerosene being completely omitted. Under these circumstances the proportion of water in the "pearls" of clay and surfactant was substantially higher than when the volatile hydrocarbon was present. Sample E illustrates the adverse effect of drying the water-proofed clay without the aid of either volatile liquid or oil. It will be seen that the grease had an excessively soft consistency as measured by penetration. The data show that the presence of a limited amount of oil together with naphtha resulted in the production of a water-proofed clay powdery product having substantially higher thickening power in a grease than when the oil was omitted.

Table I

| Sample | Surfactant/Clay, Parts, w. | Lube Oil/Clay, Parts, w. | Naphtha/Clay, Parts, w. | Filtration | Percent Clay | 3-Roll Mill, Clearance in Inches | Added Water, Percent | Percent Water in Pearls | Penetration Unworked | Penetration Worked 60 Strokes |
|---|---|---|---|---|---|---|---|---|---|---|
| A | .71 | 1.5 | 9 | | 5.0 | .0015 | | 25 | 304 | 308 |
| B | .71 | 1.5 | 9 | | 6.2 | .0015 | | | 259 | 264 |
| C | .71 | 1.5 | 0 | Buchner | 6.0 | .001 | | 80 | 274 | 294 |
| D | 1.0 | 0 | 9 | | 8.0 | .0015 | 0.1 | 39 | 424 | |
| E | 1.0 | 0 | 0 | Buchner | 8.0 | .0015 | 0.1 | 88 | >500 | |
| F | .80 | 1.5 | 9 | | 6.0 | .001 | | 25 | 220 | 245 |
| G | .80 | 0.7 | 0 | Buchner | 6.0 | .001 | | 84 | 347 | 365 |
| H | .78 | 0.7 | 4 | | 6.0 | .0015 | 0.1 | | 275 | 283 |

20-80% by weight of the mixture comprising diethylene triamine, the remaining fraction being polyethylene polyamines having an average molecular weight between 250 and 400. Specifically, such amino amides may be formed between mixtures of polyethylene amine and tall oil acid or coconut oil fatty acids.

Polymeric water-proofing agents have been described and may be utilized in accordance with the procedure of this invention. They include aminoplast and phenoplast resins and preferred combinations are aniline-formaldehyde resins and phenol-formaldehyde resins. These materials and greases made from them are described in U.S. Patents 2,829,100 and 2,890,171.

The powdered or crumbly product obtained according to the process of this invention may be employed for numerous end uses. Principal among these is grease manufacture but water-proofed clays are also useful in such products as oil based drilling fluids, completion fluids, waxed compositions, shoe polishes, waxed candles, asphalt, paints, lacquers, and the like.

One of the chief advantages of utilizing the process of this invention comprises the ability to produce a water-proofed clay having a surprisingly high gelling or thickening power without immediately compounding the same or other environment in which it is to be used. Thus it is possible to ship the comminuted (granular or powdered) water-proofed clay to any point where it is then further compounded with any medium desired. Due to the use of the particular process of the invention this is possible without the necessity of employing the elaborate apparatus necessary in most grease-making plants. A high-shear device is preferred for most purposes, however.

EXAMPLE I

Table I illustrates the use of the process of this invention under a variety of conditions. The surfactant employed was an amino amide formed between polyethylene polyamine mixture and tall oil fatty acids. The clay utilized was hectorite and the light hydrocarbon was a naphtha having a boiling range of 230-300° F. (samples A-G) and a kerosene having a boiling range of 330-390° F. in sample H. The process was carried out in some instances utilizing nine parts by weight of naphtha or kerosene per part of clay and in other instances combining the naphtha with 1.5 parts by weight of a lubricating oil per part of clay. For the purpose of comparison samples C and G illustrate an alternative to the process wherein a limited amount of lubricating oil was utilized for separating water, In each case the above samples were prepared as follows: Hectorite clay was dispersed in water to form a clay hydrosol containing 2.0% by weight of clay. The surfactant was dispersed in warm water together with 7% by weight of phosphoric acid based on the clay and the suspension so formed was mixed with the clay hydrosol. Immediately thereafter, naphth (or naphth plus lubricating oil) was added with mixing to the aqueous clay-surfactant dispersion. This resulted in the formation of "pearls" comprising hydrocarbon in which the clay water-proofed with the surfactant was suspended together with a minor proportion of water. The major amount of water, constituting about 90% of the original water in the two suspensions, separated and was removed.

The "pearls" were heated with stirring at a temperature sufficient to volatilize the remaining water and the volatile hydrocarbon, the residue being powdery or crumbly water-proofed clay particles either with or without lubricating oil. These were milled in a high-shear milling device together with additional lubricating oil to form the grease composition which was tested for both unworked penetration and for penetration after being worked sixty strokes.

EXAMPLE II

The effect of ratio of the volatile hydrocarbon to clay upon the gelling power of the water-proofed clay is illustrated in Table II for two different sets of circumstances wherein the oil to clay ratio was also varied. It will be noted that with both oil to clay ratios investigated, maximum gelling power as measured by grease penetration was obtained when the naphtha to clay ratio was about 9.

Table II

| W. Polyamide/Clay | Oil/Clay Ratio | Naphtha/Clay Ratio | 7% Clay Grease Penetration |
|---|---|---|---|
| .67 | 1.2 | 5 | 340 |
| .67 | 1.2 | 9 | 295 |
| .59 | 1.9 | .9 | 305 |
| .59 | 1.9 | 15 | 335 |

EXAMPLE III

What was the naphtha to clay ratio in the following set of examples? The effect of surfactant to clay ratio was investigated for two different oil to clay ratios, the naphtha to clay ratio in each of these cases being 9. Table III presents the result obtained. It will be seen that maximum gelling power as measured by the penetration of a grease containing sufficient of the water-proofed product to give a clay content of 7% was obtained when the weight percent of surfactant based on clay was at least 67.

*Table III*

| Oil/Clay Ratio | Surfactant/Clay, Percent | Penetration of Grease Containing 7% w. Clay |
|---|---|---|
| 1.9 | 59 | 305 |
| 1.9 | 67 | 205 |
| 1.2 | 59 | 365 |
| 1.2 | 67 | 295 |
| 1.2 | 78 | 205 |
| 1.2 | 98 | 200 |

EXAMPLE IV

The effect of oil to clay ratio for two different surfactant clay ratios was studied, the naphtha to clay ratio in each case being 9. The results obtained are given in Table IV. It will be seen that optimum results were obtained at the relatively higher oil/clay ratios and at the relatively higher surfactant to clay percentages as measured by the penetration of greases made from the powdered products obtained in the processes.

*Table IV*

| Surfactant/Clay, Percent | Oil/Clay Ratio | Penetration of Grease Containing 7% w. Clay |
|---|---|---|
| 59 | 1.2 | 365 |
| 59 | 1.9 | 305 |
| 67 | 1.2 | 295 |
| 67 | 1.9 | 205 |

EXAMPLE V 1,800 parts by weight of a 1.8% hectorite clay hydrosol was mixed with 23 parts by weight of 8.5% phosphoric acid, 6 parts by weight of an amino of polyethylene polyamines with coconut oil fatty acids, 17 parts aniline, 19 parts of 37% formaldehyde solution and 355 parts of isooctane. The "pearls" which formed were heated (after major water separation) to volatilize the isooctane and remaining water after which the water-proofed clay powder was heated for one hour at 275° F. to accelerate polymerization of the aniline and formaldehyde to form a polymer. Five parts of the resulting powder were mixed with 19 parts of a high viscosity index medium viscosity neutral mineral lubricating oil and milled three times in a paint mill to give a number one-grade grease.

We claim as our invention:

1. The process for the formation of a grease composition which comprises:
   (a) forming a montmorillonitic clay hydrosol containing 1–5% by weight of clay;
   (b) forming an aqueous dispersion of 35–125% by weight based on clay, of a hydrophobic amino amide of polyethylene polyamines and $C_{16-20}$ fatty acids, and 5–10% $H_3PO_4$ by weight based on clay;
   (c) combining the aqueous dispersion with the hydrosol;
   (d) admixing therewith 750–1,500% by weight based on clay of hydrocarbons boiling between about 225 and 400° F. and 70–150% by weight based on clay by a lubricating oil whereby a major proportion of the water separates and is removed;
   (e) heating the remaining mixture to volatilize substantially all of the hydrocarbons boiling below the gas oil range and any remaining water, whereby a substantially anhydrous particulate product is formed comprising clay particles water-proofed with amino amide;
   (f) mixing a minor grease forming amount of the product with a lubricating oil;
   (g) and subjecting the mixture so formed to shearing action whereby a grease structure is formed.

2. A process for the preparation of an oil thickening composition suitable for dispersal in an oil to form an oil composition of greater consistency than that of the unmodified oil which comprises admixing a clay hydrosol with (a) 35–125% by weight, based on clay of a water-proofing coating compound, (b) 500 to 5000% by weight based on clay of a water-immiscible inert organic liquid having a boiling range between about 150 and 450° F., and (c) 50–200% by weight, based on the clay, of a lubricating oil, whereby the clay, coating compound and a minor proportion of water associate with the lubricating oil and organic liquid and the major proportion of water forms a separate phase, removing the separate water phase and volatilizing remaining water and volatile organic liquid whereby an oil-thickening composition is formed comprising clay bearing a superficial coating of the water-proofing compound, and lubricating oil.

3. A process for the preparation of an oil-thickening composition which comprises admixing a clay hydrosol with (a) 35–125% by weight, based on clay, of a cationic hydrophobic surface active agent, (b) 650–2500% by weight based on clay of a relatively volatile liquid hydrocarbon, and (c) 50–200% by weight, based on the clay, of a lubricating oil, whereby a major proportion of the water in the clay hydrosol separates from the remaining components, removing the separated water and heating the remaining components to remove residual water and hydrocarbon whereby a substantially anhydrous oil-thickening composition comprising clay bearing a water-proofing coating of surface active agent and lubricating oil essentially free of volatile hydrocarbons is formed.

4. A process for the preparation of a grease-forming gelling composition comprising (a) forming a hydrosol of a montmorillonitic clay, (b) forming an aqueous dispersion of a hydrophobic amino amide and phosphoric acid, (c) mixing the clay hydrosol with the aqueous dispersion, (d) admixing therewith 750–1500% by weight of relatively volatile hydrocarbons having a boiling range between about 150 and 450° F. and 100–150% by weight, based on the clay, of lubricating oil, whereupon a major proportion of water separates and is removed, and heating the remaining components to volatilize the volatile hydrocarbons and any remaining water whereby a gelling composition is formed comprising particulate clay bearing a water-proofing coating of the amino amide and lubricating oil.

5. A process according to claim 4 wherein the proportion of amino amide is 60–85% based on weight of clay.

6. A process according to claim 5 wherein the proportion of light hydrocarbon to clay is 800–1,200%.

References Cited by the Examiner
UNITED STATES PATENTS
2,623,853  12/52  Stross _____ 252—28
2,971,922  2/61   Clem _____ 252—28 X FOREIGN PATENTS
534,711  12/56  Canada.
850,913  10/60  Great Britain.

DANIEL E. WYMAN, *Primary Examiner.*

JOSEPH R. LIBERMAN, JAMES S. BAILEY,
*Examiners.*